United States Patent
Fritz et al.

[15] 3,693,417
[45] Sept. 26, 1972

[54] MICROHARDNESS TESTER REGULATED BY A MAGNETOSTRICTIVE CONTROL ARRANGEMENT

[72] Inventors: Joseph Henry Fritz; Thomas Gerald Johns, both of Columbus, Ohio

[73] Assignee: Bell Telephone Laboratories, Incorporated, Murray Hill, N.J.

[22] Filed: June 25, 1970

[21] Appl. No.: 49,586

[52] U.S. Cl. .........................73/81, 310/26, 318/653
[51] Int. Cl. ................................................G01n 3/42
[58] Field of Search............73/81, 83, 78, 90, 95, 99, 73/100; 318/653; 310/26

[56] References Cited

UNITED STATES PATENTS

| 2,790,321 | 4/1957 | Huyser | 73/83 |
| 2,858,696 | 11/1958 | Underwood | 73/83 |
| 3,499,321 | 3/1970 | Baker | 73/99 |
| 3,104,349 | 9/1963 | Stevens | 310/26 X |

Primary Examiner—Charles A. Ruehl
Attorney—R. J. Guenther and Edwin B. Cave

[57] ABSTRACT

A hardness testing device is disclosed which includes a driving motor, an indenter and a force compensating mechanism for regulating the force transmitted to the indenter from the driving motor.

5 Claims, 1 Drawing Figure

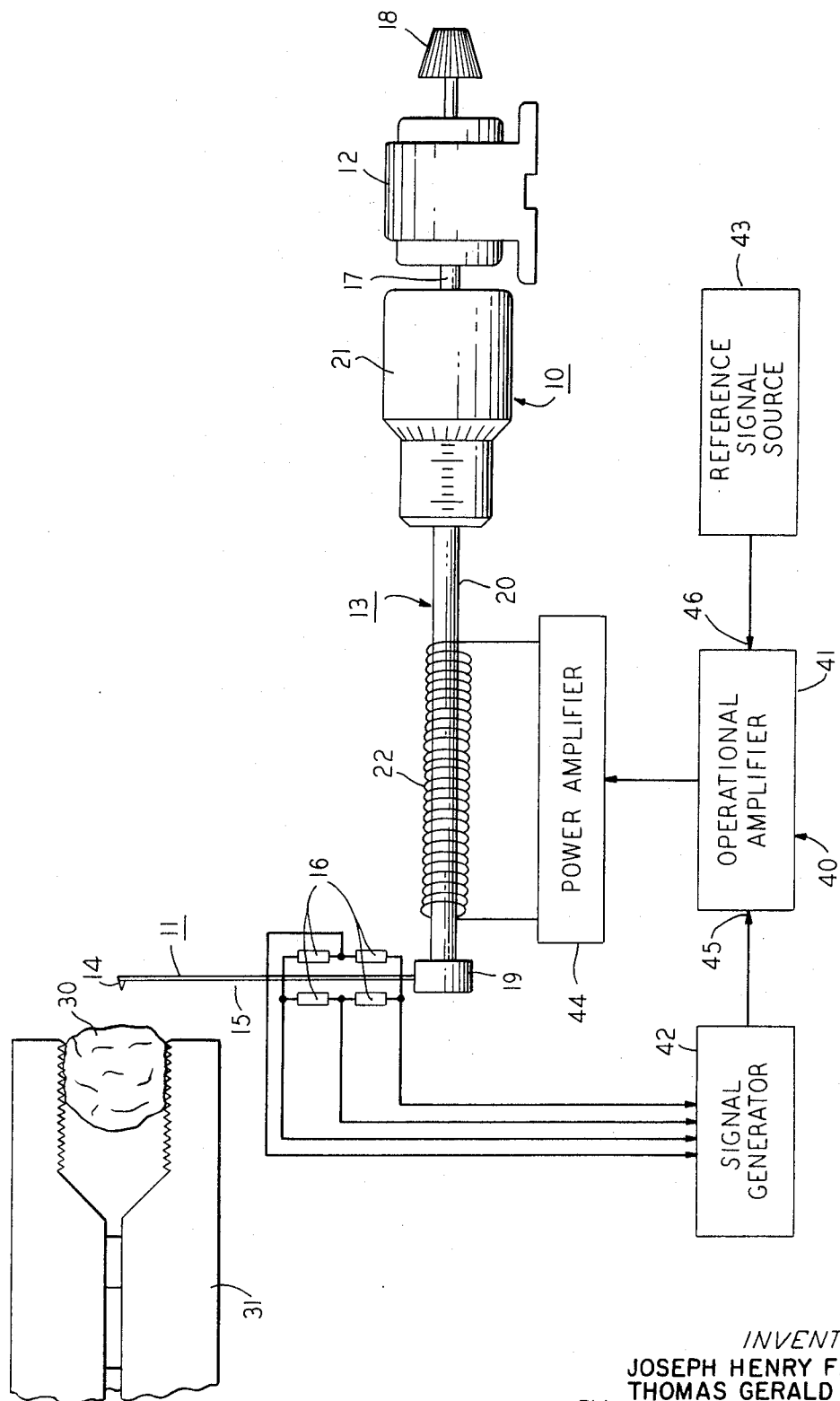

MICROHARDNESS TESTER REGULATED BY A MAGNETOSTRICTIVE CONTROL ARRANGEMENT

BACKGROUND OF THE INVENTION

1. Field of the Invention

This invention relates to apparatus for measuring the hardness of materials and pertains, in particular, to apparatus for measuring the hardness of thin materials.

2. Description of the Prior Art

Testing apparatus for making hardness measurements typically comprises an indenter and a mechanism for pressing the indenter into the surface of the material to be tested. A predetermined amount of force is applied to the indenter and hardness is determined as a measure of the depth of penetration.

Where the material to be tested is very thin, the testing procedure becomes extremely delicate. For example, if the force is not carefully controlled, the thin surface of the specimen can easily be penetrated thereby preventing a hardness measurement.

Accordingly, the object of this invention is to carefully and precisely regulate the force of penetration an indenter exerts against a test specimen.

SUMMARY OF THE INVENTION

In accordance with one embodiment of this invention, a source of prime force and an indenter which is adapted to penetrate the surface of a test specimen in response to application of the prime force are combined with a transducer for selectively generating a compensating force in aid of or in opposition to the prime force whereby the force being exerted by the indenter can be precisely maintained at a predetermined magnitude.

In accordance with one feature of this invention, the transducer is a magnetic rod which magnetostrictively changes its length in response to the magnitude of the difference between the force of penetration exerted by the indenter and a reference force level.

BRIEF DESCRIPTION OF THE DRAWING

FIG. 1 is a schematic drawing of a hardness tester made in accordance with this invention.

DETAILED DESCRIPTION

Referring to the drawing, a hardness tester 10 is disclosed which comprises an indenter 11, a motor 12 and transducer apparatus 13. The indenter 11 is designed to penetrate a test specimen under the impetus of a prime force generated by the motor 12 and transmitted by the transducer 13.

The indenter 11 comprises a stylus 14 located at the end of a deflectable arm 15. The arm 15 is mounted as a cantilever and is rigidly attached at one end to the transducer 13. In addition, it includes several strain gauges 16 mounted on its mid section.

The motor 12 is a conventional electrically powered motor which drives a central shaft 17. One end of the shaft 17 terminates in an adjusting knob 18, while the other end engages the transducer 13. The gearing between the motor 12 and the shaft 17 is not specifically shown, but any conventional arrangement will do which adjusts the motor output to drive the shaft 17 at a desired rate.

The transducer 13 comprises a support 19, a rod 20 and a micrometer 21 all mounted in serial relation to each other. The support 19 is rigidly attached to the arm 15, the rod 20 is surrounded by a coil 22 and the micrometer 21 is attached to the shaft 17. In the embodiment illustrated the coil 22 applies a continuous and saturating magnetic field through the rod 20 and the rod 20 is adapted to respond magnetostrictively to that field. The micrometer 21 is adapted to measure the lateral movement of the support 19 with respect to the other components as it moves in response either to manual rotation of the adjusting knob 18 or motor rotation of the shaft 17.

When a specimen such as sample 30 is to be tested, it is mounted in a gripping jaw 31 so as to lie in the path of the stylus 14. The stylus 14 is then brought into rough contact with the specimen 30 by manually rotating the adjusting knob 18. Thereafter, the pressure exerted by the stylus 14 on the specimen 30 is automatically regulated by the servo system 40.

The servo system 40 comprises a conventional operational amplifier 41, a signal generator 42, a reference signal source 43 and a power amplifier 44. The operational amplifier 41 is conventional and has two inputs 45 and 46. The reference signal source 43 generates an output representative of a desired force level and is attached to one operational amplifier 41 so that its output is applied to input 46. In practice, a Wavetek Generator has proved satisfactory as a reference signal source.

The signal generator 42 is conveniently a BLH 800-130 strain indicator which, when connected to the strain gauges 16, produces a digital readout of the strain sustained by the arm 15 as it deflects. The output of the signal generator 42 is applied to input terminal 45 of the operational amplifier 41. Wen the output from the signal generator 42 indicates the force being applied by the stylus 14 differs from the force level represented by the signal from the reference signal source 43, the operational amplifier 41 transmits an appropriate signal to the power amplifier 44. In response thereto, the power amplifier 44 applies a current to the coil 22 thereby modifying the magnetic field passing through the rod 20.

Where the force being exerted by the stylus 14 exceeds the magnitude of the force level represented by the output of the reference signal source 43, the magnetic field in the rod 20 is reduced thereby causing the rod 20 to magnetostrictively shrink. As the rod 20 shrinks, the net force reaching the stylus 14 is reduced, thereby changing the output of the strain gauges 16 and causing an appropriate readjustment in the servo system 40. These readjustments continue until the operational amplifier 41 ceases to transmit a signal to the power amplifier 44. At this point, the force being exerted by the stylus 14 upon the specimen 30 has reached the desired magnitude.

Once initial equilibrium has been reached, the servo system 40 will thereafter, within the available limits, automatically maintain a constant force at the stylus 14 by appropriately stretching or shrinking the rod 20 magnetostrictively. Thus, the rod 20 functions as a source of compensating force which opposes or aids the prime force generated by the motor 11 to regulate the net force being exerted by the stylus 14. While in the embodiment illustrated, the rod 20 is magnetostric-} tive, it will be recognized that other compensating arrangements will work equally as well. Where the rod 20 is magnetic, however, operating tests have demonstrated that fabricating it from supermendur will permit lateral movements of 0.0005 inch. Movement of that magnitude has proved fully adequate in making microhardness measurements of thin materials such as the contacting surface of an electrical contact. Additional lateral movement, however, can be achieved by increasing rod length. The composition of supermendur can be found in *Proceedings of the Conference on Magnetics and Magnetic Materials*, by H. L. B. Gould and D. H. Wenny, American Institute of Electrical Engineers, 1957 or *Encyclopedia of Chemical Technology*, Vol. 12, 2nd Edition, John Wiley and Co., at pages 737–772.

It will be understood that the apparatus disclosed is designed solely to control depth of penetration in the test specimen. It does not actually measure hardness. Rather, hardness determinations are made after penetration is complete. For example, after test, the specimen 30 is placed in a scanning electron microscope to measure the depth of penetration. The depth so measured is then compared with an appropriate chart to determine hardness.

In summary, testing apparatus has been disclosed herein in which the force applied to a test specimen during penetration can readily and easily be regulated with precision. It will be understood, however, that the embodiment disclosed is merely illustrative of the principles of the invention and that many others falling within the scope of the invention will occur to those skilled in the art.

We claim:

1. Apparatus for measuring the hardness of thin materials comprising:
   motor means;
   transducer means operatively engaged with said motor means for linear displacement thereby, said transducer means having magnetostrictive properties;
   cantilever means connected to said transducer means at one end thereof;
   indenter means connected to the opposite end of said cantilever means; and
   servo control means for magnetostrictively controlling the length of said transducer means thereby correcting the force applied through said indenter means to a predetermined value.

2. Apparatus in accordance with claim 1 wherein said transducer means includes a cylindrical rod made of a magnetic material.

3. Apparatus in accordance with claim 2 wherein said magnetic material is supermendur.

4. Apparatus in accordance with claim 2 wherein said servo control means includes a coil surrounding said rod.

5. Apparatus in accordance with claim 1 wherein said cantilever means includes force sensors for generating a control signal having a magnitude proportional to the amount said cantilever deflects.

* * * * *